United States Patent
Chase et al.

(10) Patent No.: US 10,477,668 B2
(45) Date of Patent: Nov. 12, 2019

(54) VECTOR CONTROL OF RADIO FREQUENCY SIGNAL IN NARROW BAND LOADS DRIVEN BY INJECTION LOCKED MAGNETRON USING CARRIER AMPLITUDE MODULATION BY SPECTRAL ENERGY SPREADING VIA PHASE MODULATION

(71) Applicants: Brian E. Chase, Aurora, IL (US); Ralph J. Pasquinelli, Batavia, IL (US); Fermi Research Alliance, LLC, Batavia, IL (US)

(72) Inventors: Brian E. Chase, Aurora, IL (US); Ralph J. Pasquinelli, Batavia, IL (US)

(73) Assignee: Fermi Research Alliance, LLC, Batavia, IL (US)

(*) Notice: Subject to any disclaimer, the term of this patent is extended or adjusted under 35 U.S.C. 154(b) by 255 days.

(21) Appl. No.: 15/512,264

(22) PCT Filed: Oct. 2, 2014

(86) PCT No.: PCT/US2014/058750
§ 371 (c)(1),
(2) Date: Mar. 17, 2017

(87) PCT Pub. No.: WO2016/043783
PCT Pub. Date: Mar. 24, 2016

(65) Prior Publication Data
US 2017/0280549 A1    Sep. 28, 2017

Related U.S. Application Data

(60) Provisional application No. 62/052,718, filed on Sep. 19, 2014.

(51) Int. Cl.
| | | |
|---|---|---|
| *H05H 7/02* | (2006.01) | |
| *H01J 25/50* | (2006.01) | |
| *G01P 15/00* | (2006.01) | |

(52) U.S. Cl.
CPC ............... *H05H 7/02* (2013.01); *G01P 15/00* (2013.01); *H01J 25/50* (2013.01)

(58) Field of Classification Search
None
See application file for complete search history.

(56) References Cited

U.S. PATENT DOCUMENTS

2004/0085096 A1* 5/2004 Ward ..................... G01P 15/08
327/2
2012/0326636 A1   12/2012 Eaton et al.
(Continued)

FOREIGN PATENT DOCUMENTS

WO   2013090342 A1   6/2013

*Primary Examiner* — Jany Richardson
(74) *Attorney, Agent, or Firm* — Kevin Soules; Luis M. Ortiz; Kermit D. Lopez

(57) ABSTRACT

A method, system, and apparatus for vector control of radio frequency signals in narrow band devices such as Superconducting Radio Frequency (SRF) cavities driven by injection locked magnetrons using carrier amplitude modulation by spectral energy spreading via phase modulation comprises coupling a magnetron to a cavity associated with a particle accelerator and injection locking the magnetron. A modulated amplitude and modulated phase of a drive signal is provided to the magnetron powering the cavity associated with the particle accelerator by removing power from a carrier according to a modulation scheme and providing vector control of the cavity radio frequency vector.

20 Claims, 6 Drawing Sheets

(56) References Cited

U.S. PATENT DOCUMENTS

2017/0250651 A1\* 8/2017 Kazakevich ............. H03B 9/10
2019/0069387 A1\* 2/2019 Kazakevich ............. H05H 7/02

\* cited by examiner

VECTOR CONTROL OF RADIO FREQUENCY SIGNAL IN NARROW BAND LOADS DRIVEN BY INJECTION LOCKED MAGNETRON USING CARRIER AMPLITUDE MODULATION BY SPECTRAL ENERGY SPREADING VIA PHASE MODULATION

CROSS REFERENCE TO RELATED APPLICATIONS

This application is the US national phase of International Application No. PCT/US2014/0058750, filed on Oct. 2, 2014 under the PCT (Patent Cooperation Treaty), and claims priority to U.S. Provisional Patent Application Nos. 62/052,718, filed Sep. 19, 2014. The entire contents of these applications are incorporated herein by reference.

FIELD OF THE INVENTION

The disclosed embodiments relate to Superconducting cavities. More specifically, the disclosed embodiments relate to the regulation of both radio frequency amplitude and phase in narrow band devices such as Superconducting Radio Frequency (SRF) cavities driven by constant power output devices such as magnetrons.

BACKGROUND

RF power sources for accelerators have been traditionally based on a variety of technologies including triodes, tetrodes, klystrons, IOTs, and solid-state amplifiers. The first four are vacuum tube amplifiers; a technology that has been the prime source for powers exceeding hundreds or even thousands of watts. Solid-state has become a strong competitor to power amplifiers in the kilowatt(s) power level up to 1 GHz. All of these technologies have a significant cost that can range from $5-$25 per watt of output power. These same technologies have AC to RF power efficiency potential of close to 60% in continuous wave saturated operation. These technologies are expensive and are relatively inefficient.

Magnetrons are another vacuum tube technology. Unlike the other devices listed, magnetrons are oscillators, not an amplifier. Magnetrons are the devices used in kitchen microwave ovens, industrial heating systems, and military radar applications. The attractive parameter of magnetrons in the particle accelerator field is the cost per watt of output power. The cost of a garden variety 1 kW magnetron one might find in their kitchen is under $10. There are simple, ready to use magnetron ovens available at under $100 at this power level. Industrial 80 kW continuous wave (CW) heating magnetron sources at 915 MHz are commercially available for $75 K.

Another benefit of magnetrons is their efficiency. While alternative technologies approach 60% efficiency at saturated power output, industrial magnetrons routinely operate at the 70% to 80% efficiency level. This improved efficiency can considerably reduce the operating electricity cost over the life of an accelerator.

However, for particle accelerator applications, a high degree of vector control is essential to achieve the required stable accelerating gradient. Therefore, a need exists for a magnetron that can provide an output that is essentially a saturated value for the given voltage and current applied to the device. The present invention includes injection locking means used to provide a very stable output phase and provides high dynamic range control of the amplitude with additional signal conditioning as disclosed herein.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

The disclosed embodiments relate to magnetrons.

The disclosed embodiments also relate to particle accelerators and radio frequency cavities.

The disclosed embodiments further relate to vector control of radio frequency signals in narrow band devices such as Superconducting Radio Frequency (SRF) cavities driven by injection locked magnetrons using carrier amplitude modulation by spectral energy spreading via phase modulation.

The above and other aspects can be achieved as is now described. A method, system, and apparatus for vector control of radio frequency signals in narrow band devices such as Superconducting Radio Frequency (SRF) cavities driven by injection locked magnetrons using carrier amplitude modulation by spectral energy spreading via phase modulation comprises coupling a magnetron to a cavity associated with a particle accelerator and injection locking the magnetron. A modulated amplitude and modulated phase of a drive signal is provided to the magnetron powering the cavity associated with the particle accelerator by removing power from a carrier according to a modulation scheme and providing vector control of the cavity radio frequency vector.

BRIEF DESCRIPTION OF THE FIGURES

The accompanying figures, in which like reference numerals refer to identical or functionally-similar elements throughout the separate views and which are incorporated in, and form a part of, the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
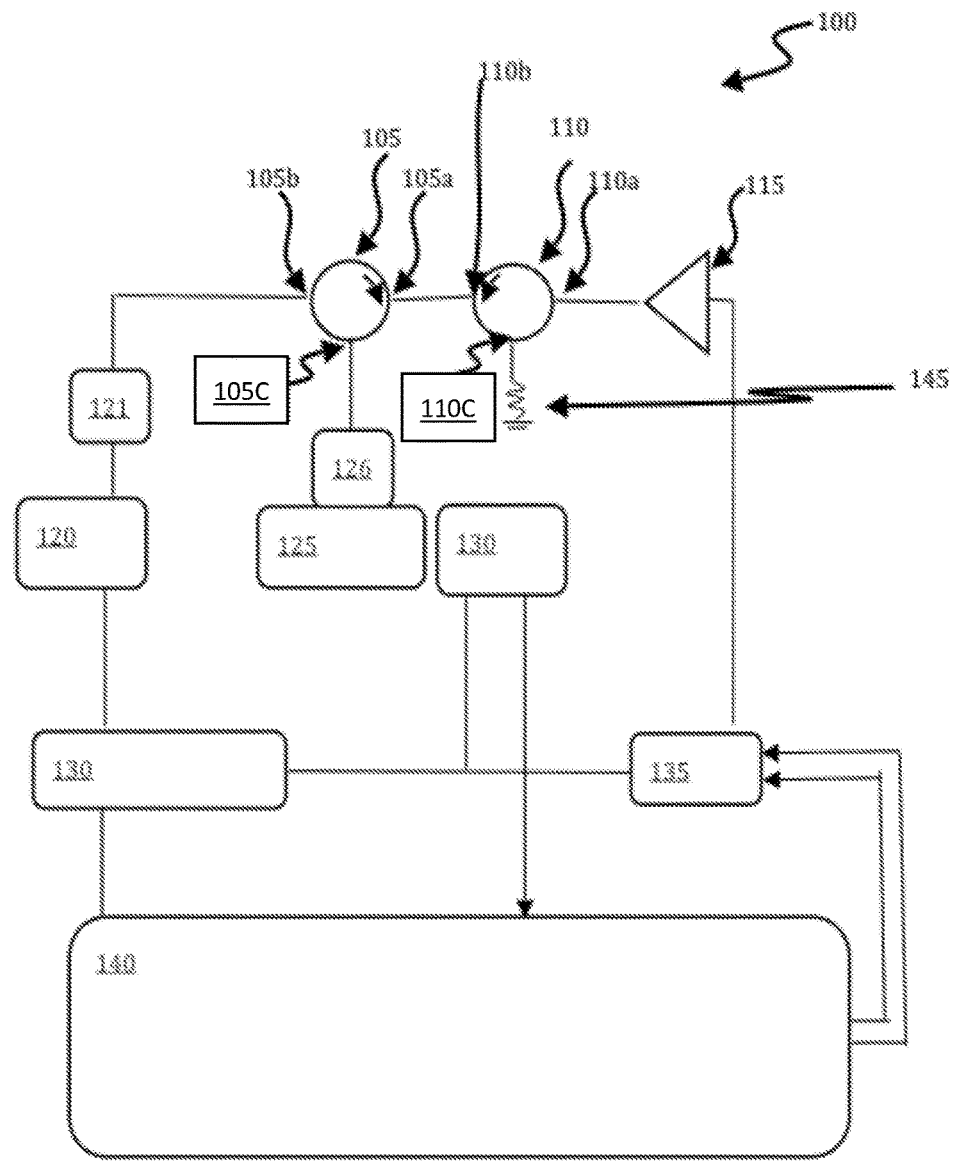
FIG. 1 illustrates a block diagram of a system for powering a particle accelerator using a magnetron, according to one embodiment.

FIG. 1 illustrates a block diagram of a system 100 for powering a superconducting cavity for particle acceleration with a magnetron in accordance with one embodiment of the invention. While FIG. 1 is illustrative of a preferred embodiment in which a magnetron (RF power device) is used to supply power to a cavity associated with a particle accelerator, this embodiment is exemplary. It should be understood that any RF power device can be used to power any number of applications in accordance with the disclosed embodiments. The described phase modulation for vector control technique may be applied to applications where it is desirable to operate an RF power device in a saturated state while controlling the amplitude and phase in the carrier. Possible devices are klystrons, IOTs, triodes, and other power tubes as well as solid state amplifiers. RF devices requiring power could be any device such as RF cavities, RF filters, or antennas that have a narrow band response that will reject the phase modulation generated sidebands.

For particle accelerator applications, a high degree of vector control is essential to achieve the requisite accelerating gradient, which must be very stable. In one embodiment, a magnetron 125 can have an output that is a saturated value for the given power supply voltage and current applied to the magnetron 125. Injection locking can then be used to provide a very stable output phase. High dynamic range control of the amplitude is achieved with additional signal conditioning as disclosed herein.

Thus, in one aspect of the invention filtering all but the carrier signal on the output spectrum of the magnetron 125 provides a fully vector controlled power source. This is particularly attractive for use with cavities such as Superconducting Radio Frequency (SRF) cavity 120 in particle accelerator applications as shown in FIG. 1. Tens of megavolts per meter of accelerating gradients can be attained with a modest (kilo-watts) RF drive power. The cavity 120 acts as a transformer between the RF power amplifier 115 and the accelerating gap seen by a beam in cavity 120. With loaded Q's ranging from $10^6$ to $10^9$, the cavity 120 bandwidth is very narrow, often in the 10s of Hertz. This narrow bandwidth still allows power to accurately control the cavity field and transfer energy to a charged particle beam in the cavity 120 efficiently, as there is only a tiny amount of energy dissipated by the super-conducting cavity 120. Because of the narrow bandwidth of the cavity 120, the phase modulated (PM) sidebands, which may start at 300 kHz, are greatly attenuated in the cavity 120 and are reflected by the cavity 120 back to circulator 110 and to an absorptive load 145.

Circulators 105 and 110 are necessary in part because of the high levels of power that may be reflected from an SRF cavity under certain conditions (i.e., when no beam is present in the cavity 120). Circulators (such as circulators 105 and 110) are three-port devices that have low insertion loss in the forward direction (port one 105a or 110a to port two 105b or 110b), high isolation in the reverse direction (port two 105b or 110b to port one 105a or 110a), and low reverse insertion loss to port three (port two 105b or 110b to port three 105c or 110c). Hence, all of the reflected power ends up in a well-matched load on the third port 110c.

It should be appreciated that any arrangement of devices may be used for polar modulation as long as the radio frequency (RF) power device, such as magnetron 125, is able to track the phase-frequency waveform, and the absolute phase reference is maintained. In one embodiment of the invention, a sine wave modulation waveform can be generated in discrete time. In other embodiments, other waveforms such as a triangle may also be used, but may also require more bandwidth. Waveforms may also be optimized for minimal bandwidth.

In one embodiment of the invention, magnetron 125 can be an industrial magnetron at 2.45 GHz, the same frequency used in kitchen microwave ovens and the continuous wave (CW) saturated output power can be 1.2 kilowatts. This frequency and power level were chosen based on cost and availability of components, but others may be advantageously used in other embodiments.

The magnetron 125 is an oscillator (i.e., a self-generating RF power source). A magnetron can be forced to operate at a very specific frequency within its oscillation range by injection locking. Injection locking is an effect that occurs when a harmonic oscillator is disturbed by a second oscillator operating at a similar frequency. When the coupling between the oscillators is sufficient and when the frequencies are similar, the first oscillator will have an identical frequency to the second. In this embodiment, the magnetron 125 has an "injection gain" of the input-driving signal that can range from 15 to 25 dB. This is the experimentally determined highest gain coming from the lowest drive signal that will cleanly lock the oscillation frequency of the magnetron 125.

Figure 4:
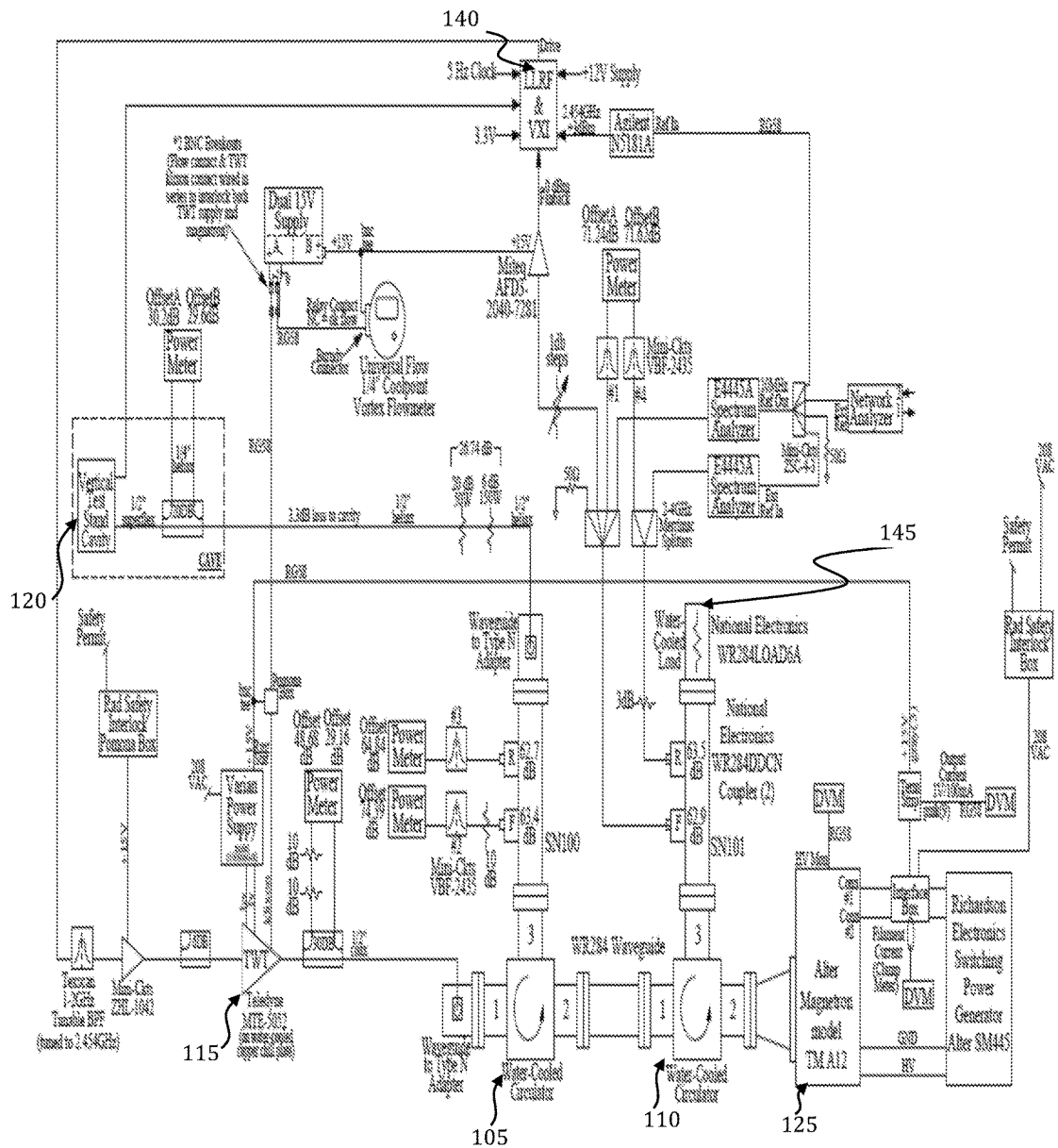
FIG. 4 illustrates a block diagram of an alternative system for powering a particle accelerator using a magnetron, in accordance with the disclosed embodiments.

Injection locking requires a significant number of components in addition to the magnetron 125. As shown in FIG. 1, the two circulators 105 and 110 act as isolation devices, a drive amplifier 115, directional couplers connected to ports three (105c and 110c) for signal monitoring (not shown), interlock (comprising a water flow meter, power connections, etc., as shown in FIG. 4), and protection circuitry are all used as part of the injection locking mechanism. The embodiment illustrated in FIG. 1 uses an industrial 2.45 GHz magnetron 120 capable of 1.2 kilowatts of continuous output power (CW). It should be appreciated that other magnetrons may be used according to design considerations, and the magnetron described herein is not intended to limit the scope of the invention. In this embodiment, injection gain for locking is on the order of 20 dB or a factor of 100 in power. In this embodiment, a drive power of only 12 watts required.

In FIG. 1, amplifier 115 is a traveling wave tube (TWT) amplifier. In other embodiments, any amplifier could be used. This could be a solid-state unit, or, in a very high power system greater than 100 kW, another injection locked magnetron. The TWT amplifier 115 is coupled to the first of two circulators 110 and 105 arranged in series. The circulator 110 is a three-port device that has low insertion loss in the forward direction, high isolation in the reverse direction, and low reverse insertion loss to port three. The throughput power is then applied to the second circulator 105 with minimal insertion loss and passed on to the magnetron 125. The magnetron 125 is a one-port device, so the input power and output power are on the same port 126. For an RF power system like that shown in FIG. 1, the power out of the magnetron 125 is then passed to port 3 of the circulator 105 and on to the load of cavity 120. An optional directional coupler 121 may also be included in certain applications. It should be appreciated that directional coupler 121 is not required for the disclosed embodiments to operate.

Some of the power on load 120 and 121 will be reflected back to circulator 105. In the case of an SRF cavity such as cavity 120, all the RF power is reflected until the particle beam (not shown) transverses the cavity gap (not shown). It is critically important that the reflected power not reach the drive amplifier 115 as it could easily damage or destroy it. Here, circulator 110 guides the reflected power safely to a load 145 on port three 110c. In a preferred embodiment, isolation factors for circulators 105 and 100 can exceed 100.

In the embodiment shown in FIG. 1, with SRF cavity 120, the power needed in the absence of a beam is very small. In this embodiment, it is acceptable to terminate port three 105c of circulator 105 with a load and use only a small portion of the output power from the magnetron 125 that is reflected by the load 121 on circulator 105 to drive the SRF cavity 120 via circulator 110 port three 110c.

A digital controller module 140 can regulate the drive signal. A sample of the cavity voltage can be fed back to the digital control module 140 for closed loop regulation of amplitude and phase. The sample of the cavity voltage (or probe signal) can be received at microwave receiver 130. In one embodiment, microwave receiver 130 can be a superheterodyne 8-channel microwave receiver. The microwave receiver 130 can receive the I/Q modulation feedback signals and then down converts, for example, the 2.45 GHz probe signal to a 24.5 MHz intermediate frequency that is then fed to the digital controller module 140. Power levels are measured at all the test ports where directional couplers are located. This can include coupler 121 and/or couplers attached to ports three (105c and 110c) of circulators 105 and 110, respectively. For safe operation, it is important to monitor water flow and x-ray detectors near the cavity. These are incorporated into the interlock system.

Figure 2:
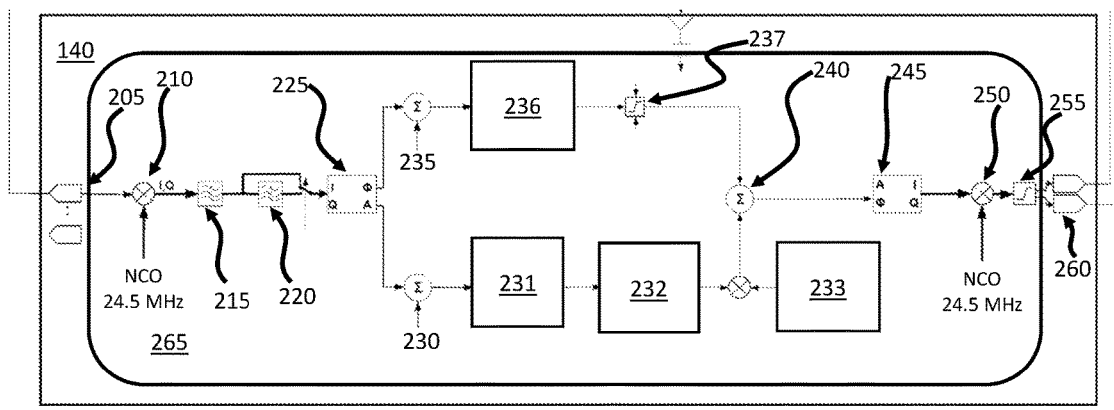
FIG. 2 illustrates a block diagram of a digital controller module, in accordance with the disclosed embodiments.

A block diagram of the Digital Controller module 140 is shown in FIG. 2. In one embodiment, the Digital Controller Module can be a low-level radio frequency system or module (LLRF). The signal path through the various modules of the invention may be traced as shown in FIG. 2.

After the 8-channel microwave receiver down-converts, for example, the 2.45 GHz cavity probe signal to a 24.5 MHz intermediate frequency (IF), that signal is provided to LLRF 140. An analog to digital converter 205 provides a digital data stream representation of the IF signal to a Field Programmable Gate Array 265 (FPGA). Within the FPGA 265, a digital receiver 210 converts the IF to a baseband analytic signal represented by In-phase (I) and Quadrature (Q) components. Both are required for full vector control. The signal is provided to a low pass filter 215 to remove unwanted mixing products and then the complex In-phase and Quadrature signals (I/Q) can be sent through, or bypass, the cavity simulator 220 before being converted to a polar representation of amplitude and phase by a CORDIC block 225. CORDIC stands for Coordinated Rotation Digital Computer. CORDIC blocks are generally configured to compute multiple common mathematical functions often with multiple inputs and outputs.

The separate amplitude and phase signals from the CORDIC block 225 are then input to an amplitude summing junction 230 associated with an amplitude proportional-integral feedback controller 231 and phase summing junction 235 associated with a phase proportional-integral feedback controller 236, respectively. A programmable phase set point and amplitude set point are also input to the respective summing junctions. A programmable limiter 237 limits the range of the phase control loop. The amplitude controller 231 outputs drives phase modulation to amplitude modulation linearizing block 232, creating a phase modulation depth control signal that is multiplied with a sine wave of a programmed and pre-selected frequency generated by a phase modulation frequency generator 233. The amplitude PI controller 231 controls the phase modulation depth of the signal of a sinusoidal phase modulator of fixed frequency. Modulation frequencies range from 100 kHz to 500 kHz, but could be of any value appropriate for the application.

This now amplitude-controlled sine wave is summed at 240 with phase shift request of the phase control providing the phase modulation input to the second CORDIC block 245. The amplitude input of the CORDIC block 245 is a sellable parameter that is held constant during operation. The in-phase and quadrature term outputs from the CORDIC block 245 are digitally up-converted at 250 back to the IF frequency, then clamped by limiter 255 before being converted back to analog with analog to digital converters 260, and then up-converted from IF back to RF. The output drive is then a constant amplitude carrier that is phase modulated by the sum of the phase controller and the sinusoidal phase modulator.

Figure 3:
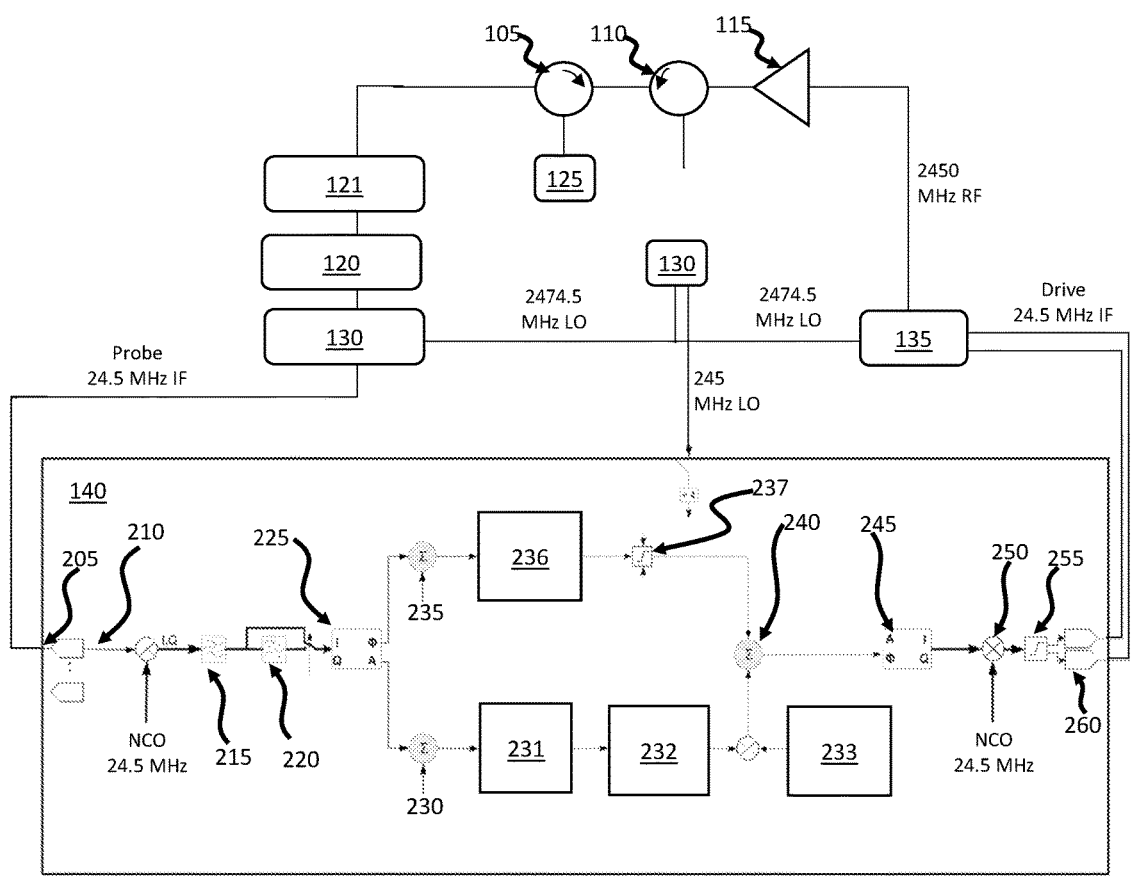
FIG. 3 illustrates an exemplary block diagram of a system for powering a particle accelerator using a magnetron, in accordance with the disclosed embodiments.

FIG. 3 illustrates the system with exemplary signal frequencies included for reference. It should be understood that these frequencies represent one possible configuration and that other frequencies may be similarly implemented according to design considerations. The LLRF drive signal is provided to transmitter 135 and then amplified at amplifier 115. The signal is then injected into the magnetron 125 via circulators 110 and 105 as shown, which frequency and phase locks to the drive signal.

The magnetron 125 output signal is directed by the circulator 105 to the cavity 120 and contains all the PM generated sidebands generated by the LLRF system 140. The center frequency signal now contains only the intended amplitude signal as requested by the AM PI controller 231 and the phase information requested by the PM PI controller 236. The PM sidebands are spaced out in multiples of the phase modulator frequency and are rejected by the narrow band cavity 120 back to the circulator 110 and are terminated by the load 145. The cavity probe signal is returned to the LLRF system 140 via the receiver 130, and is used as the feedback path signal.

FIG. 4 illustrates a detailed block diagram of the system in accordance with another alternative embodiment of the invention. The specific equipment (i.e., brand name, operating range, etc.) described in the figure is intended to be exemplary and is not intended to limit the scope of the invention. Other equivalent equipment may be alternatively used depending on design considerations.

Figure 5:
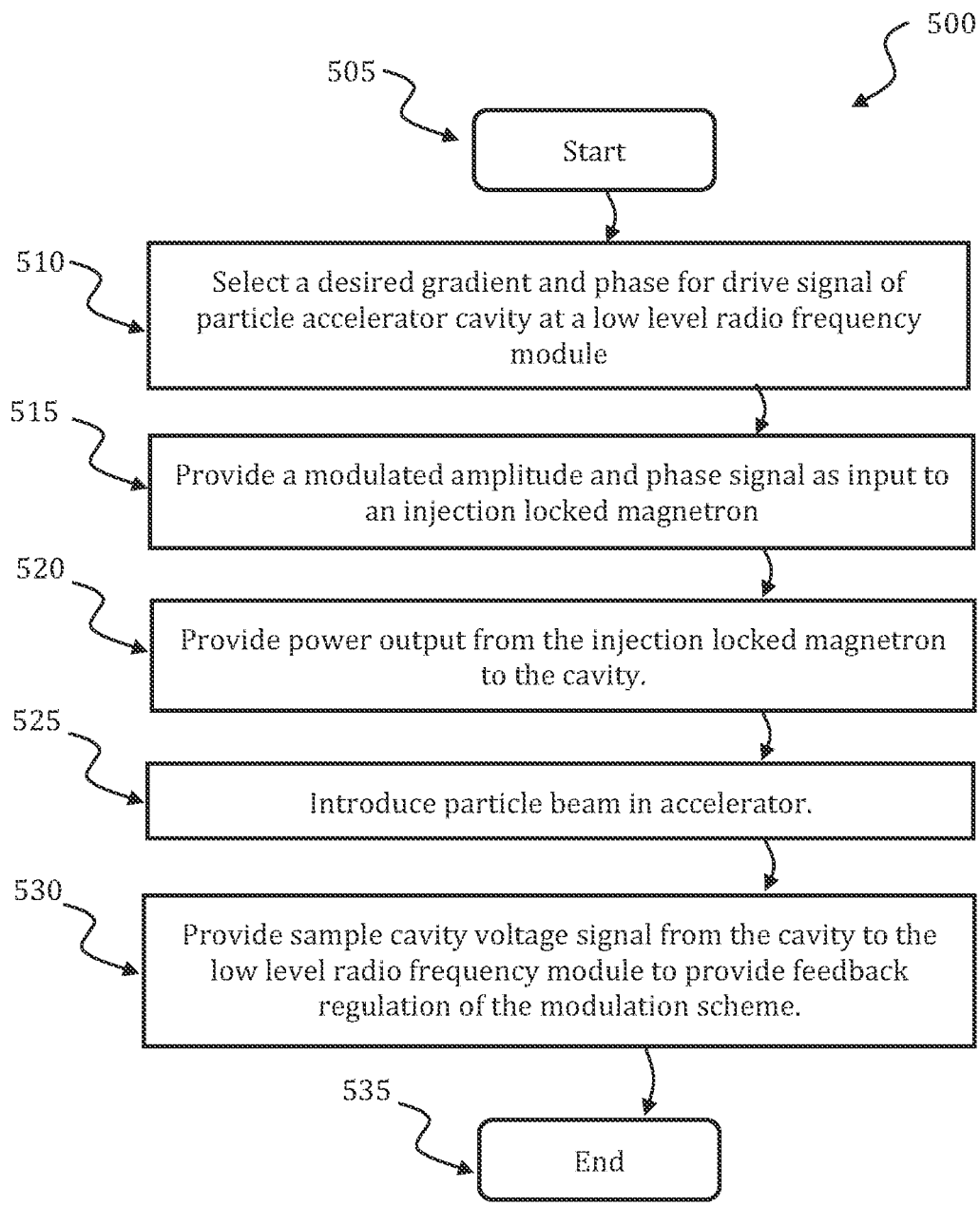
FIG. 5 illustrates a high level flow chart of logical operational steps associated with a method for powering a cavity associated with a particle accelerator, in accordance with the disclosed embodiments.

FIG. 5 provides a high level flowchart 500 of logical operational steps associated with a method for vector control of radio frequency signals in narrow band devices such as SRF cavities driven by injection locked magnetrons using carrier amplitude modulation by spectral energy spreading via phase modulation.

The method 500 begins at block 505. Next at block 510, a desired gradient and phase for the drive signal of the cavity associated with a particle accelerator application is selected and set using the low level radio frequency module. It should be appreciated that the LLRF module can have an interface configured to provide the user the ability to set the desired gradient and phase. Alternatively, the various modules associated with the LLRF module can be configured by the user to provide the desired gradient and phase for the drive signal.

Next at block 515, the modulated amplitude and phase signal can be used to injection lock the magnetron. At block 520, power is supplied from the injection locked magnetron to the cavity associated with a particle accelerator. It should be appreciated that the modulated phase and amplitude signal will vary depending on the LLRF module settings, the magnetron, the cavity, the particle accelerator, and the specific application.

Phase modulation is used to control the amplitude of the carrier and can be approached using either time or frequency domain analysis. A sinusoidal phase modulated signal is expressed according to Equation 1:

$$y(t) = A_c \sin(\omega_c t + A_m \sin(\omega_m t) + \Phi_c)$$  Eq. (1)

With the phase modulation $A_m$ is the modulation depth and wm is the modulation frequency. Frequency translation to baseband ($\omega_c=0$), allows for simple phasor analysis and because the cavity bandwidth may be 10,000 times smaller than the modulation frequency, the modulation sidebands become insignificant and only the carrier phasor is left. Integrating and removing small terms leaves:

$$y_{(carrier)} = A_c \cos(A_m) + \Phi_c$$  Eq. (2)

Once power has been supplied to the cavity, a particle beam can be introduced to the cavity at block 525. The injection locked magnetron is regulated by the LLRF to provide consistent and continuous power to the cavity until the application is complete. As the power is supplied to the cavity, a sample cavity voltage signal can be taken from the cavity and provided to the LLRF, as shown at block 530. This signal is then used in a feedback loop to maintain regulation of the modulation scheme. Once the application associated with the accelerator is complete, the method ends at block 535.

Figure 6:
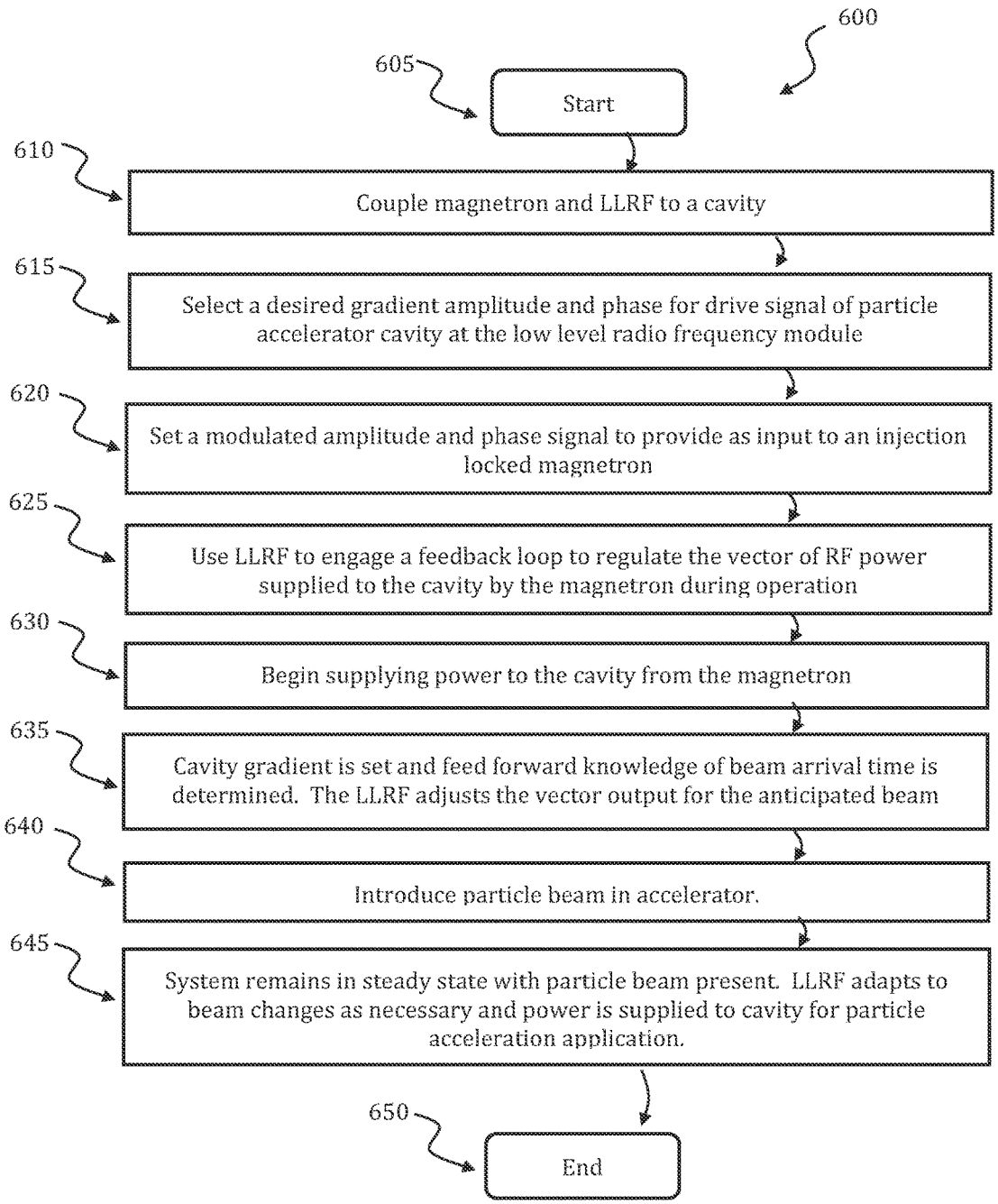
FIG. 6 illustrates a more detailed flow chart of logical operational steps associated with a method for the regulation of both radio frequency amplitude and phase in narrow band devices such as Superconducting Radio Frequency (SRF) cavities driven by constant power output devices such as magnetrons, in accordance with the disclosed embodiments.

FIG. 6 illustrates a more detailed flow chart 600 of logical operational steps associated with a method for the regulation of both radio frequency amplitude and phase in narrow band devices such as SRF cavities driven by constant power output devices such as magnetrons.

The method begins at block 605. At block 610, the LLRF module and the magnetron can be electrically coupled to a cavity designed for use with a particle accelerator for particle accelerator applications. At block 615, a desired gradient and phase are selected for the drive signal of the cavity. This can be accomplished by manipulating the LLRF module settings and at block 620, the modulated amplitude and phase signals are set. Power supplies and interlocks can be made up in advance so that an LLRF module can engage feedback loops to regulate the vector of RF power, as shown at block 625. This may include providing a sample cavity voltage signal from the particle accelerator to the LLRF module. The LLRF module can separate the amplitude and phase from the sample cavity voltage signal in order to modulate the amplitude and phase of the drive signal.

Before the particle beam is introduced to the cavity, power can be supplied to the cavity from the injection locked magnetron, as shown at block 630. It should be appreciated that the feedback loop described in block 625 can continue throughout the remaining steps in order to regulate the amplitude and phase of the cavity frequency vector associated with the cavity.

At this point, the amplitude is increased to a desired level to achieve the desired acceleration gradient and phase. This level may be predetermined. Next at block 635, the cavity gradient is set with feed forward and the beam arrival time is determined. The LLRF can adjust the vector output for the anticipated beam in this step. Feed forward reduces the correction required by allowing the feedback to eliminate any remaining error.

As shown at 640, a particle beam can be introduced to the cavity. The LLRF dynamically adjust for changing beam currents so that from this point, the system can remain in a steady state (i.e., providing acceleration of the particles in the accelerator). Reflected power can be safely transmitted to a load via a circulator, where the reflected power is terminated. This mode continues undisturbed unless or until a fault occurs, as shown at block 645. Depending on the nature of the fault, operator intervention may be required. The method then ends at block 650 once the particle accelerator application is complete.

Based on the foregoing, it can be appreciated that a number of different embodiments, preferred and alternative are disclosed herein. For example, in one embodiment, a method for vector control of radio frequency signals in narrow band devices such as SRF cavities driven by injection locked magnetrons using carrier amplitude modulation by spectral energy spreading via phase modulation comprises coupling a magnetron to a cavity associated with a particle accelerator; injection locking the magnetron; providing a modulated amplitude and modulated phase of a drive signal to the magnetron; and powering the cavity associated with the particle accelerator with the injection locked magnetron thereby removing power from a carrier according to a modulation scheme and providing vector control of a cavity radio frequency vector.

The method further comprises regulating the amplitude and phase of the cavity radio frequency vector using a low level radio frequency module. In one embodiment, the method includes providing a sample cavity voltage signal from the cavity associated with the particle accelerator to the low level radio frequency system thereby providing feedback regulation of the modulation scheme. This can include separating an amplitude of the sample cavity voltage signal and a phase of the sample cavity voltage signal in order to modulate an amplitude and a phase of the drive signal.

In another embodiment, the method further comprises guiding reflected power away from the cavity using a circulator and terminating the reflected power at a load associated with the circulator. The cavity can comprise a superconducting cavity.

In another embodiment, a system for powering a cavity associated with a particle accelerator comprises a phase locked magnetron electrically connected to the cavity and configured to provide power to the cavity associated with the particle accelerator. A low level radio frequency module is configured to provide a modulated amplitude and modulated phase of a drive signal to injection lock the magnetron wherein powering the cavity associated with the particle accelerator with the injection locked magnetron removes power from a carrier according to a modulation scheme and provides vector control of a cavity radio frequency vector.

In another embodiment, the system further comprises a sample cavity voltage signal provided from the cavity associated with the particle accelerator to the low level radio frequency module thereby providing feedback regulation of the modulation scheme. A cordic block is configured for separating an amplitude of the sample cavity voltage signal and a phase of the sample cavity voltage signal. Additionally, a phase proportional-integral controller is configured for modulating a phase of the drive signal and an amplitude proportional-integral controller is configured for modulating an amplitude of the drive signal.

In another embodiment, the system further comprises a circulator configured for guiding reflected power away from the cavity and a load associated with the circulator configured for safely terminating the reflected power. An interlock system can be configured to monitor a water flow and x-ray output of the magnetron. The cavity may comprise a superconducting cavity.

In yet another embodiment, an apparatus for powering a cavity associated with a particle accelerator comprises a phase locked magnetron electrically connected to the cavity and configured to provide power to the cavity associated with the particle accelerator and a low level radio frequency module configured to provide a modulated amplitude and modulated phase of a drive signal to injection lock the magnetron wherein powering the cavity associated with the particle accelerator with the injection locked magnetron removes power from a carrier according to a modulation scheme and provides vector control of a cavity radio frequency vector.

In another embodiment, the apparatus comprises a sample cavity voltage signal provided from the cavity associated with the particle accelerator to the low level radio frequency module thereby providing feedback regulation of the modulation scheme. A cordic block is configured for separating an amplitude of the sample cavity voltage signal and a phase of the sample cavity voltage signal. Additionally, a phase proportional-integral controller is configured for modulating a phase of the drive signal and an amplitude proportional-integral controller is configured for modulating an amplitude of the drive signal.

In yet another embodiment, the apparatus comprises a circulator configured for guiding reflected power away from the cavity and a load associated with the circulator configured for safely terminating the reflected power. An interlock system can be configured to monitor a water flow and x-ray output of the magnetron. The cavity can comprise a superconducting cavity.

It will be appreciated that variations of the above-disclosed and other features and functions, or alternatives thereof, may be desirably combined into many other different systems or applications. Furthermore, various presently unforeseen or unanticipated alternatives, modifications, variations or improvements therein may be subsequently made by those skilled in the art which are also intended to be encompassed by the following claims.

What is claimed is:

1. A method comprising:
    coupling one radio frequency device to a device requiring power;
    modulating an amplitude of a drive signal for said device requiring power via phase modulation, with a digital control module such that phase modulated sidebands outside the bandwidth of the device requiring power are reflected and only a carrier remains;
    controlling said modulated amplitude via said phase modulation according to a modulation depth control signal and a phase modulation signal;
    providing said drive signal to said radio frequency device; and
    powering said device requiring power with said radio frequency device and removing power associated with said modulated sidebands outside the bandwidth of the device requiring power thereby providing a modulation scheme comprising vector control of a radio frequency vector required for said device requiring power.

2. The method of claim 1 wherein said radio frequency device comprises one magnetron and said device requiring power comprises a cavity associated with a particle accelerator.

3. The method of claim 2 further comprising:
    regulating the amplitude and phase of said radio frequency vector using a low level radio frequency module.

4. The method of claim 3 further comprising:
    injection locking said magnetron; and
    providing a sample cavity voltage signal from said cavity associated with said particle accelerator to said low level radio frequency system thereby providing feedback regulation of said magnetron.

5. The method of claim 4 further comprising:
    separating an amplitude of said sample cavity voltage signal and a phase of said sample cavity voltage signal in order to modulate an amplitude and a phase of said drive signal.

6. The method of claim 3 further comprising:
    guiding reflected power in said phase modulated sidebands away from said cavity using a circulator; and
    terminating said reflected power at a load associated with said circulator.

7. The method of claim 3 wherein said cavity comprises a superconducting cavity.

8. A system for powering a device requiring power comprising:
    a radio frequency device electrically coupled to said device requiring power, configured to provide power to said device requiring power; and
    a low level radio frequency module comprising: an amplitude PI controller that controls the amplitude of a drive signal via phase modulation of said drive signal, said low level radio frequency module configured to provide a modulated amplitude and modulated phase of said drive signal to said radio frequency device wherein powering said device requiring power with said radio frequency device further comprises modulating sidebands outside the bandwidth of the device requiring power such that said sidebands are reflected and only a carrier remains, thereby providing vector control of a radio frequency vector associated with said device requiring power.

9. The system of claim 8 wherein said radio frequency device comprises one injection locked magnetron and said device requiring power comprises a cavity associated with a particle accelerator.

10. The system of claim 9 further comprising:
a sample cavity voltage signal provided from said cavity associated with said particle accelerator to said low level radio frequency module thereby providing a feedback regulation.

11. The system of claim 10 further comprising:
a first cordic block for converting the sample cavity voltage signal to a polar representation; and
a second cordic block configured for separating an amplitude of said sample cavity voltage signal and a phase of said sample cavity voltage signal.

12. The system of claim 11 further comprising:
a phase proportional-integral controller configured for modulating a phase of said drive signal; and
an amplitude proportional-integral controller configured for modulating an amplitude of said drive signal.

13. The system of claim 12 further comprising:
a circulator configured for guiding reflected power in said phase modulated sidebands away from said cavity; and
a load associated with said circulator configured for safely terminating said reflected power.

14. The system of claim 9 further comprising an interlock system configured to monitor a water flow and x-ray output of said magnetron.

15. The system of claim 9 wherein said cavity comprises a superconducting cavity.

16. An apparatus for powering a cavity associated with a particle accelerator comprising:
a phase locked magnetron electrically connected to said cavity and configured to provide power to said cavity associated with said particle accelerator; and
a low level radio frequency module said low level radio frequency module comprising:
an amplitude controller that drives phase modulation to an amplitude modulation linearizing block configured to provide a phase modulation depth control signal;
a phase modulation frequency generator for generating a wave of a pre-selected frequency that is multiplied with said phase modulated depth control signal;
an amplitude PI controller configured to control said phase modulation depth control;
wherein said low level radio frequency module is configured to provide a modulated amplitude via phase modulation of a drive signal to injection lock said magnetron wherein powering said cavity associated with said particle accelerator with said injection locked magnetron removes power from a carrier according to a modulation scheme and provides vector control of a cavity radio frequency vector.

17. The apparatus of claim 16 further comprising:
a sample cavity voltage signal provided from said cavity associated with said particle accelerator to said low level radio frequency module thereby providing feedback regulation of said modulation scheme.

18. The apparatus of claim 17 further comprising:
a first cordic block for converting said sample cavity voltage signal to a polar representation; and
a second cordic block configured for separating an amplitude of said sample cavity voltage signal and a phase of said sample cavity voltage signal.

19. The apparatus of claim 18 further comprising:
a phase proportional-integral controller configured for modulating a phase of said drive signal; and
an amplitude proportional-integral controller configured for modulating an amplitude of said drive signal.

20. The apparatus of claim 18 further comprising:
a circulator configured for guiding reflected power in said phase modulated sidebands away from said cavity; and
a load associated with said circulator configured for safely terminating said reflected power.

* * * * *

UNITED STATES PATENT AND TRADEMARK OFFICE
CERTIFICATE OF CORRECTION

PATENT NO. : 10,477,668 B2
APPLICATION NO. : 15/512264
DATED : November 12, 2019
INVENTOR(S) : Brian E. Chase It is certified that error appears in the above-identified patent and that said Letters Patent is hereby corrected as shown below:

In the Specification (Column 1, Lines 20-28) should read:
STATEMENT OF GOVERNMENT RIGHTS
The invention described in this patent application was made with Government support under the Fermi Research Alliance, LLC, Contract Number DE-AC02-07CH11359 awarded by the U.S. Department of Energy. The Government has certain rights in the invention.

Signed and Sealed this
Twenty-ninth Day of August, 2023

Katherine Kelly Vidal
*Director of the United States Patent and Trademark Office*